United States Patent [19]
Kolanowski et al.

[11] Patent Number: 4,733,463
[45] Date of Patent: Mar. 29, 1988

[54] ELECTRICAL CABLE HARNESS FABRICATION

[75] Inventors: Clarence Kolanowski, LaGrange; Richard L. Patterson, Riverside, both of Ill.

[73] Assignee: Molex Incorporated, Lisle, Ill.

[21] Appl. No.: 9,307

[22] Filed: Jan. 30, 1987

Related U.S. Application Data

[63] Continuation-in-part of Ser. No. 768,382, Aug. 22, 1985, abandoned.

[51] Int. Cl.[4] .................... H01R 43/04; B23P 23/00
[52] U.S. Cl. .................................... 29/861; 29/33 F; 29/33 M; 29/564.6; 29/749
[58] Field of Search ................ 29/33 F, 33 M, 564.4, 29/564.6, 593, 749, 861

[56] References Cited

U.S. PATENT DOCUMENTS 4,285,118 8/1981 Peppler et al. .
4,419,817 12/1983 Funcik et al. .
4,439,919 4/1984 Cheh et al. .
4,580,340 4/1986 Shields .
4,596,072 6/1986 Shields .

*Primary Examiner*—Howard N. Goldberg
*Assistant Examiner*—Carl J. Arbes
*Attorney, Agent, or Firm*—John W. Cornell; Louis A. Hecht

[57] ABSTRACT

The present invention provides an improved method and assembly for testing the electrical integrity of a multi-circuit cable harness. An intermediate harness product is prepared including a short test tab comprising a portion of insulated multiconductor cable extending from a terminated multi-circuit connector. The test tab is stripped to expose at least a portion of the tab conductors. Adjacent exposed portions of the tab are contacted with a test probe capable of electrically testing the adjacent circuits of the harness. If a positive test result is obtained, the test tab is trimmed to provide the finished cable harness product. If a negative test result is obtained, the test tab is left on the intermediate harness product to provide a ready visual indication of a defective cable harness product.

6 Claims, 8 Drawing Figures

ELECTRICAL CABLE HARNESS FABRICATION

CROSS-REFERENCE TO RELATED APPLICATION

This application is a Continuation-in-part of prior application Ser. No. 768,382, filed Aug. 22, 1985 now abandoned.

BACKGROUND OF THE INVENTION

The present invention relates to a new and improved method and apparatus for testing the quality of a cable harness as an integrated step in a harness fabrication process. More particularly, it relates to a harness fabrication process which provides a test tab site for testing and which also provides a ready visual indication of cable quality.

Cable harnesses are widely used in electronic and electrical products today. Generally, cable harnesses include at least one multicircuit connector terminated to an insulated multi-conductor cable. Most cable harnesses, such as double-ended and daisy chain harnesses, include several connectors terminated to a common cable segment. These may be used for making jumper connections between printed circuit boards in electronic components. Most cable harnesses in use today employ one piece or two piece mass terminated connectors including insulation displacement type electrical contacts. Insulation displacement connectors are well suited for use in automated cable assembly.

Both semi-automatic and fully automated cable harness fabricators are presently known. Illustrative examples include those described in U.S. Pat. Nos. 4,285,118; 4,439,919; 4,419,817; 4,580,340; 4,596,072, to name but a few.

A unique apparatus for fully automated fabrication of daisy chain harnesses is disclosed in commonly assigned U.S. application Ser. No. 745,171 filed June 17, 1985. In that apparatus, a plurality of mating pairs of electrical connector parts are terminated to a continuous flat cable segment. Termination is accomplished by compressing a predetermined cable portion between a pair of connector parts one of which includes a plurality of insulation displacement terminals positioned therein. In the apparatus each connector part is carried by a tooling station on a rotatable indexing turret. The opposed turrets are moveable toward each other at a termination station to effect termination. In use, a cable is advanced through the termination station of the apparatus and the turrets are rotated to bring mating connector halves into registration. The turrets are advanced toward each other to terminate the connector to a predetermined portion of the cable. The process is repeated until all the connectors have been applied at spaced apart portions on the cable. Thereafter, cutting blades, mounted on the turrets are rotated into alignment at the termination station and are moved toward each other to sever the completed harness from the cable supply.

In current commercial environments, manufacturers of electronic and electrical instruments are now requiring interconnection manufacturers to supply increasing quantities of cable harnesses on a just-in-time delivery schedule with zero defects.

Alternatively, these manufacturers are requesting their suppliers of cable and connectors to provide them with the necessary tooling to permit harness fabrication to be performed by them at their own locations according to their own schedules. In these arrangements, the electronics manufacturers need to perform quality control evaluations for their adapted, now in-house, harness fabrication operations.

For these reasons, there is presently a need for fully automated cable harness fabrication methods which also include an automated integral harness testing capability to provide an immediate quality control evaluation of the harnesses produced.

SUMMARY OF THE INVENTION

It is an object of the present invention to provide a method and apparatus for fabricating and testing cable harnesses in a single fully automated harness production process.

It is another object of the present invention to provide a method and apparatus which may be readily incorporated into existing cable harness fabricators to retrofit these fabricators with quality control testing ability in a manner integral to the harness fabrication production process.

These and other objects of the present invention are provided in a new and improved method of fabricating a cable harness including the steps of providing a termination station whereat an insulated multiconductor cable is terminated to a multicircuit connector; feeding multiconductor cable to said termination station; supplying connectors to said termination station; applying a connector to the cable while at the termination station; cutting the cable adjacent the connector to provide a cable harness product; ejecting the harness product thus formed from the termination station; and testing the electrical integrity of the cable harness, the improvement in said harness testing step comprising:

cutting said cable at a point spaced from the connector to form an intermediate harness product having a test tab including segments of the cable conductors extending beyond the connector; stripping at least a portion of the insulation from the test tab to expose a portion of the conductor segments; electrically testing by engaging adjacent exposed portions of the conductors with a test probe to test the electrical integrity of the harness between them; repeating the above step for all of the adjacent conductors of the cable harness tab; generating an output signal indicative of a positive or negative test result to a trimming actuator control; and thereafter selectively trimming the test tab from those acceptable harnesses which generated a positive output signal during the testing step.

In accordance with the method of the present invention, the presence of a test tab on a cable harness when it reaches the end of the production line provides a ready visual indication of a defective cable harness. The presence of the test tab can be easily detected by an operator whose job it is to unload and package product for shipment or can be readily detected by an automated unloading and packaging apparatus.

The objects of the present invention are also provided in a harness fabricator of the type including a termination station whereat the insulated multiconductor cable is terminated to a multicircuit connector, means for feeding multiconductor cable to said termination station, means for supplying connectors to said termination station, means for applying a connector to a cable while at the termination station, means for cutting the cable adjacent the connector, means for ejecting the terminated and cut cable harness from the termination station, and harness testing means for testing the electrical integrity of the cable harness, the improvement in the harness testing means comprising:

said cutting means being adjustable to cut said cable at a point spaced from the connector to form an intermediate harness product having a test tab including segments of the cable conductors extending beyond the conductor;

stripping means for baring the insulation from at least a portion of the test tab to expose a portion of the conductor segments; a cable tab probe for electrically engaging adjacent conductors of the cut and stripped tab to test the electrical integrity of the test tab; and means for trimming the tab after testing, whereby a harness fabricator including simultaneous production and quality control testing capability is provided.

In accordance with the apparatus of this invention the test probe includes a double-pronged electrical testing means capable of generating an output signal indicative of an electrically defective harness and further including a trimming control means adapted to receive and interpret output signals from the testing means, said control means being effective to prevent the trimming means from trimming the test tab from those harnesses identified as defective by the test probe.

The electrical testing of the test tab can be conducted after termination while at the termination station, or after the intermediate harness is ejected from the termination station.

In another embodiment of the present invention, a testing apparatus adapted to receive ejected intermediate harness products from a termination station and to test them as the products are conveyed to an unloading station is also provided.

Other objects and advantages of the present invention will become apparent from the following detailed description taken in conjunction with the drawings in which:

DETAILED DESCRIPTION OF THE PREFERRED EMBODIMENT

Figure 1:
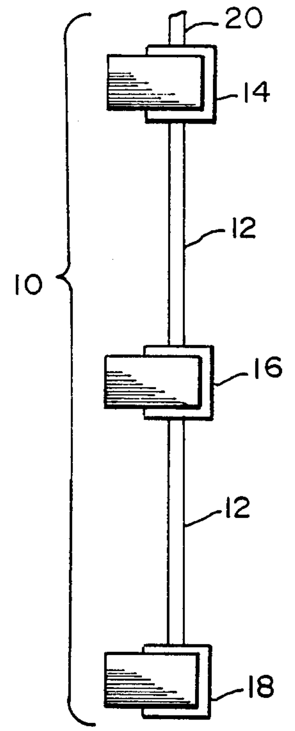
FIG. 1 is a side elevation view of an intermediate harness product adapted for testing in accordance with the new and improved method of this invention.

Referring now to FIG. 1, the new and improved harness testing method of the present invention includes the preparation and testing of an intermediate cable harness 10. As shown in FIG. 1, intermediate cable harness 10 comprises a cable harness of the type known as a daisy-chain harness including an insulated multiconductor cable 12 and three spaced-apart multicircuit connectors 14, 16 and 18 terminated to the same length of cable 12. Extending from connector 14 is a short test tab 20 including segments of the cable conductors.

Intermediate harness product 10 is prepared in accordance with conventional harness fabrication methods on conventional fabrication equipment. Typcially this includes a harness fabrication assembly having a termination station whereat multi-conductor cable is terminated to a multi-circuit connector(s). The fabrication assembly includes means for feeding mutli-conductor cable and means for supplying multi-circuit connectors to the termination station. Termination means are provided to terminate the cable to the connector(s).

Generally, the multi-circuit connectors include a two part interlocking housing including a body containing a plurality of insulation displacement contact terminals, corresponding in number and spacing to the conductors of the cable, and a cover member. At the termination station, the two connector parts are compressed together about the cable which locks the connector parts together and simultaneously causes the insulation displacement terminals of the connector to pierce the insulation of the cable and make electrical contact with the cable conductors.

After one connector has been attached to the cable, the cable is advanced to present a second portion of cable to the termination station for attachment of a second connector. The process is repeated until a harness of desired length having the desired number of attached connectors has been prepared. Harness fabricators also include a cutting means for cutting the cable adjacent the last connector of the harness to release a finished harness and present a new cable end to the termination station for preparation of another cable harness.

In accordance with the present invention, the above-identified fabrication methods are modified by adjusting the cutting means to cut the cable 12 from an otherwise completed harness at a point spaced from the last connector 14 to provide an intermediate harness product 10 including test tab 20 as shown in FIG. 1. The means for adjusting the cutting means to provide the test tab 20 will vary with the type of equipment, but will be readily apparent to those skilled in this art familiar with the fabrication equipment each uses. Further details of harness fabrication equipment and methods may be readily obtained from the above-cited U.S. patents and application and elsewhere. Moreover, several harness fabricators from several different sources are commercially available.

Figure 2:
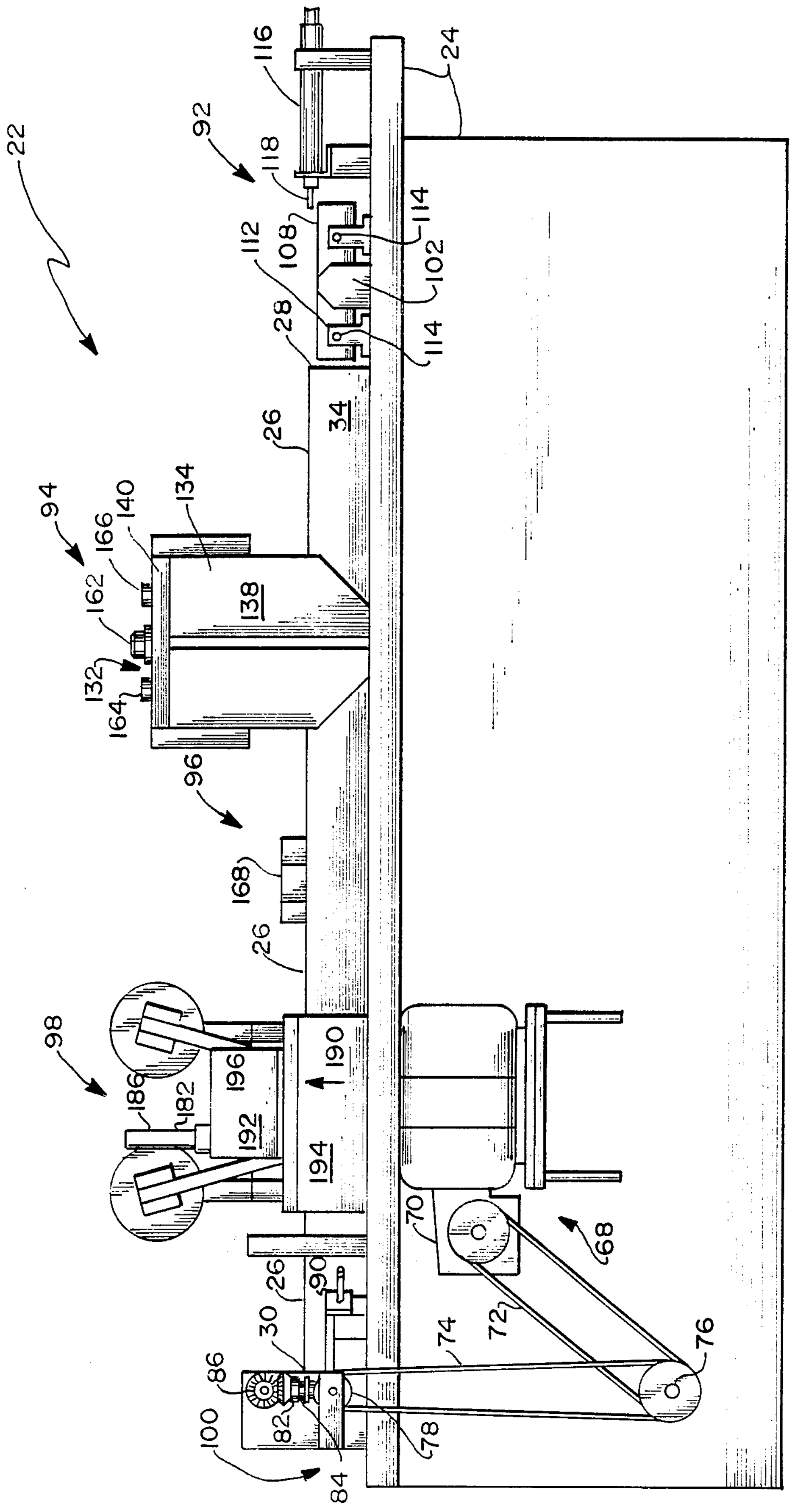
FIG. 2 is a side elevation view of the new and improved testing assembly of this invention for electrically testing the intermediate harness product shown in FIG. 1.
Figure 3:
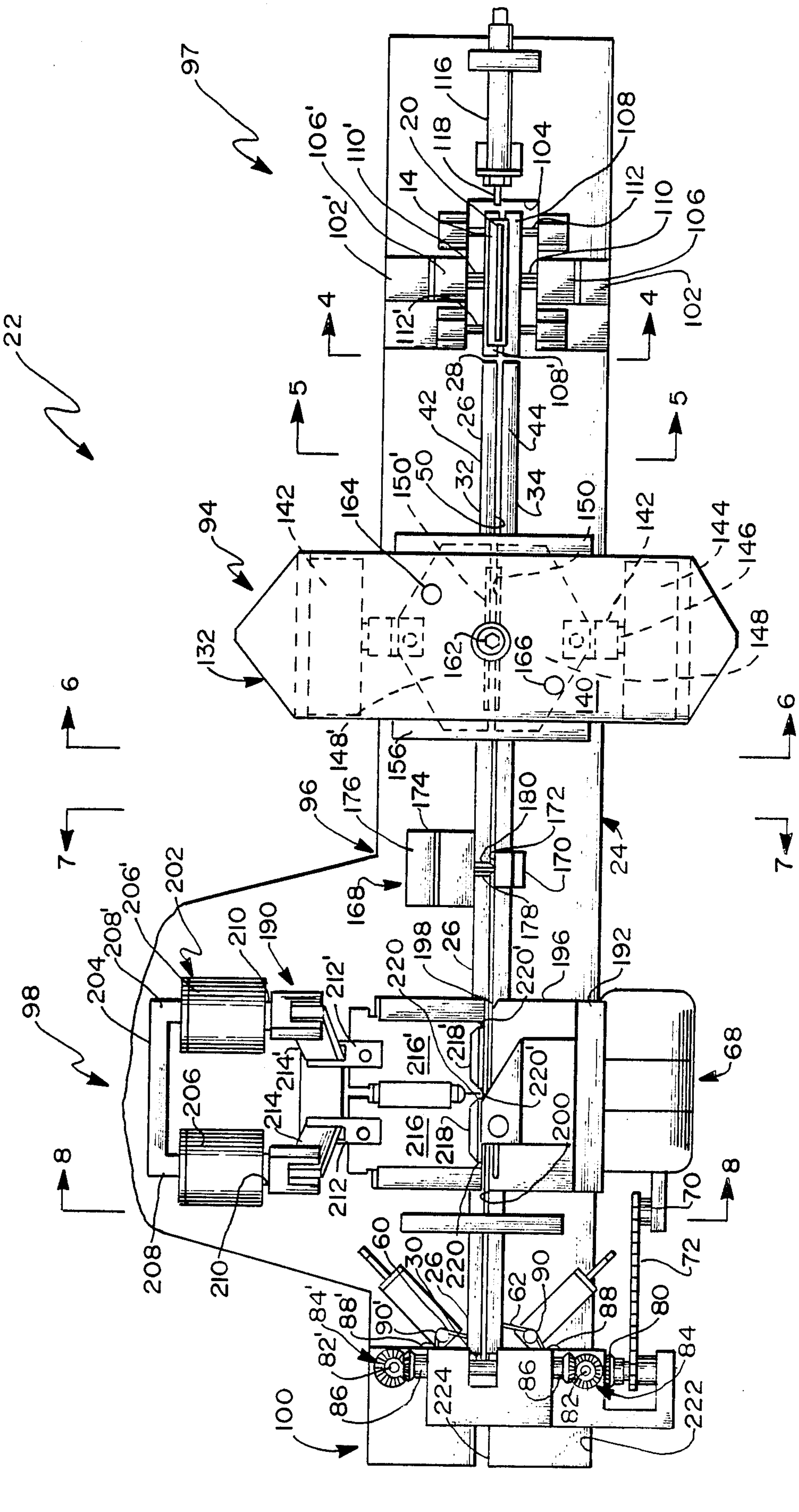
FIG. 3 is a top plan view of the new and improved testing assembly of FIG. 2.

Intermediate cable harness 10 is adapted for testing in accordance with the method of this invention on the new and improved testing assembly 22 shown in FIGS. 2-8. More particularly and as shown in FIGS. 2-3, testing assembly 22 generally comprises an overall frame assembly 24 provided with an elongate delivery track 26 extending substantially the length of the frame 24. Delivery track 26 extends between a harness receiving end 28 and a final unloading end 30.

Figure 5:
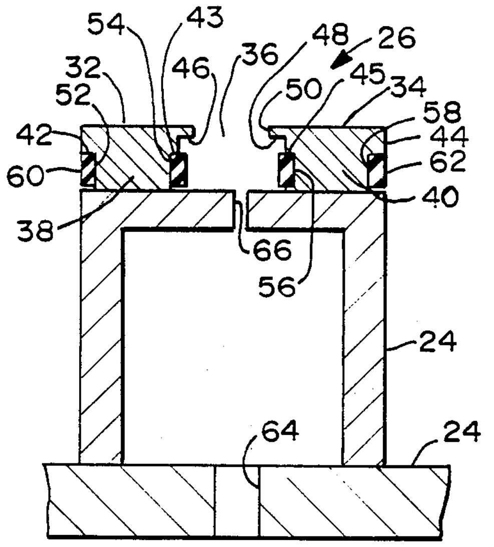
FIG. 5 is a partial side elevation sectional view of the delivery track of the new and improved testing assembly, taken along line 5—5 of FIG. 3.

More particularly, and referring now to FIG. 5, delivery track 26 is formed by a pair of opposed upstanding guide rails 32 and 34 which cooperate with frame assembly 24 to define a connector receiving channel 36.

Guide rails 32 and 34 are generally T-shaped in configuration including a vertical bar portion 38, 40 and a transverse top section 42, 44, respectively. The inner facing sides of top sections 42 and 44 are provided with opposed step shoulders 46 and 48, respectively, to form a constricted top opening 50 in connector receiving channel 36. The under facing surfaces 43 and 45 of top sections 42 and 44, respectively, cooperate with frame assembly 24 to define two pairs of belt-receiving grooves 52, 54 and 56, 58 on the opposed sides of vertical shaft portions 38 and 40, respectively. Endless drive belts 60 and 62 are mounted in belt grooves 52, 54 and 56, 58. Drive belts 60 and 62 are continuous loops. As shown in FIGS. 3 and 5, the belts are driven in the present apparatus in such manner that a point on belt 60 travels forwardly from harness-receiving end 28 along belt groove 54 to final unloading end 30, through a belt drive mechanism and returns along belt groove 52. Similarly, belt 62 advances along belt groove 56 and returns along belt groove 58. The frame assembly 24 contains an opening 64 extending along its length which forms a lower constricted opening 66 in connector receiving channel 36. Channel 36 with its upper and lower constricted openings 50 and 66 is therefore configured to prevent vertical displacements of connector 14 within delivery track 26.

An intermediate harness product 10 is advanced along delivery track 26 within channel 36 from receiving end 28 to unloading end 30 by frictional engagement of the sides of upper connector 14 with belts 60 and 62. The separation and tension of belts 60 and 62 is adjusted to permit some slippage between housing 14 and belts 60 and 62, to permit the advancing intermediate harness 10 to be temporarily stopped at various locations along track 26, so that preparation operations can be performed thereon.

The drive mechanism, generally designated at 68, for drive belts 60 and 62 appears adjacent unloading end 30 as shown in FIGS. 2-3. The drive mechanism 68 includes a drive motor 70 which is interconnected by motor chains 72 and 74 and pulleys 76, 78 to a drive gear 80. Drive gear 80 meshes with a first vertical drive shaft 82 having bevelled gearing at its upper and lower ends and a belt drive groove 84 along its length adapted to receive endless drive belt 62. Vertical drive shaft 82 meshes with a horizontal drive bar 86 which in turn meshes with the bevel gearing on the upper end of a rotatably mounted follower vertical drive shaft 82'. Drive follower 82' also includes a belt drive groove 84' adapted to receive endless drive belt 60. Drive belts 60 and 62 each exit delivery track 26 at end 30, pass around vertical drive shafts 82 and 82' in grooves 84, 84' around a roller 88, 88' and around adjustable tensioning rollers 90, 90' before re-entering outside return grooves 52 and 58 in delivery track 26, respectively. The mechanical interconnections of the drive mechanism ensure that rotation provided by drive motor causes simultaneous rotation of vertical drive shafts 82 and 82' which in turn drives belts 60 and 62 along delivery track 26. Other means for advancing an intermediate cable harness product 10 along delivery track 26 will suggest themselves to those skilled in the art.

Referring to FIG. 2 testing assembly 22 additionally includes an array of work stations 92-100 operatively connected to the frame 24 disposed along delivery track 26. The array of work stations includes: a harness receiving station 92 disposed adjacent said harness receiving end 28 of delivery track 26; a test tab stripping station 94; a harness testing station 96; a test tab trimming station 98 and an unloading station 100 located at end 30.

Testing assembly 22 is designed to receive and electrically test the electrical integrity of an intermediate cable harness product 10 by conveying intermediate harness product 10 from harness receiving station 92 along delivery track 26 through each work station 94-98 where a separate operation is performed on the intermediate harness 10 to the final unloading station 100 at end 30.

Figure 4:
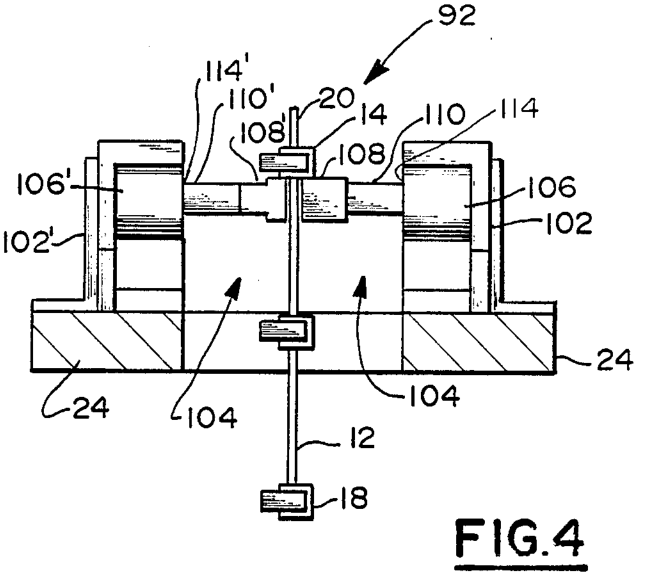
FIG. 4 is a partial, side elevation view of the harness receiving station of the new and improved testing assembly, taken along line 4—4 of FIG. 3.

Harness receiving station 92 is shown at the right hand portions of FIGS. 2 and 3 and more particularly in FIG. 4. Receiving station 92 includes a pair of opposed upstanding shuttle mounting arms 102 and 102' which are mounted on frame assembly 24 adjacent harness receiving end 28 of delivery track 26. Upstanding shuttle mounting arms 102, 102' cooperate with frame assembly 24 to define an open harness receiving column 104 into which intermediate harness product 10 is lowered. Shuttle mounting arms 102, 102' are provided with air cylinders 106, 106' for actuating reciprocable shuttle bars 108, 108' via piston rods 110, 110'. Shuttle bars 108, 108' are movable between a retracted open position where they are located immediately adjacent mounting arms 102, 102' and an extended closed position, wherein they extend across the upper portion of open column 104. In the closed position, shuttle bars 108, 108' are adapted to engage intermediate harness product 10 adjacent the sides of cable 12 at the underside of connector 14, to effectively stop further descent of harness product 10 within column 104. Shuttle bars 108, 108' are each further provided with trailing stabilizing rods 112, 112' which slidingly engage corresponding guide tubes 114, 114' within mounting arms 102, 102' to ensure that shuttle bars 108, 108' remain level during the actuation stroke of piston rods 110, 110'. The upper surfaces of shuttle bars 108, 108', are positioned so that a captured connector 14 is aligned with the entrance of connector receiving channel 36 at end 28 of delivery track 26. Receiving station 92 also includes frame-mounted air cylinder 116 which actuates pusher rod 118 between an extended position wherein pusher rod 118 extends over at least a portion of shuttle bars 108, 108' effective to push connector 14 into delivery track 26 a distance sufficient to permit the sides of connector 14 to engage drive belts 60 and 62, and a retracted position wherein it is withdrawn away from the upper opening of column 104. Pusher rod 118 is effective to push connector 14 into its delivery track so that the connector housing is entrapped by the guide rails 32, 34 within connector receiving opening 36 and with a test tab 20 extending upwardly through opening 50 in the delivery track.

The harness receiving station 92 is controlled to capture a descending intermediate product 10 adjacent the underside of connector 14 so that test tab 20 is always upwardly oriented for passage in delivery track 26. The means for accomplishing this can include an optical sensing means at the station which is effective to count a preset number of connector housings prior to activating the shuttle bars 108, 108' to close off column 104 or this may be accomplished by a timing sequence. The pusher rod 118 will be timed to cooperatively push the entrapped connector 14 after shuttle bars 108, 108' have been moved to their closed position.

The harness receiving station 92 in the embodiment shown in the drawing is adapted to receive intermediate cable harness products in a vertical orientation with test tab 20 extending from the uppermost connector 14. In preferred embodiments, the harness receiving station will be located adjacent a termination station of a harness fabricating apparatus. In especially preferred embodiments, the termination station is of the type which releases a completed intermediate harness product in a vertical orientation and upon cutting the cable to form the test tab, permits the intermediate harness product simply to drop by gravity out of the termination station for capture by harness receiving station 92. Other methods for delivering an intermediate harness product 10 to a receiving station 92 wherein the intermediate harness product is prepositioning in alignment for introducing the harness product 10 into delivery track 26 will suggest themselves to those skilled in the art.

Figure 6:
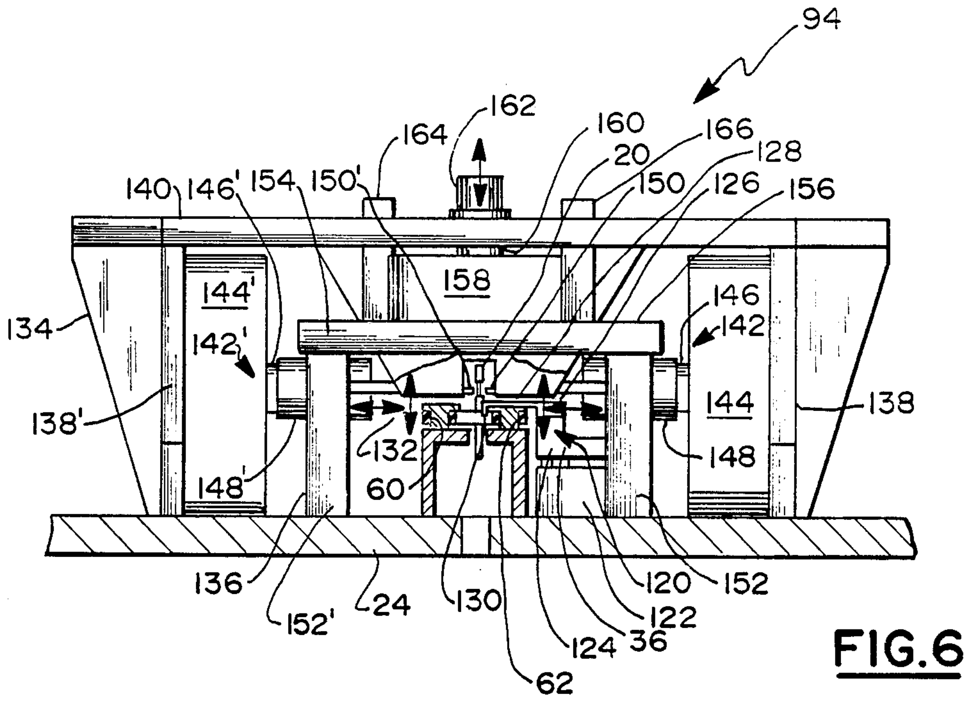
FIG. 6 is a partial side elevation view of the tab stripping station of the new and improved testing assembly, taken along line 6—6 of FIG. 3.

After pusher rod 118 has pushed connector 14 into delivery track 26 with test tab 20 extending upwardly through upper opening 50, connector 14 advances along the delivery track 26 by means of drive belts 60 and 62, toward a test tab stripping station 94 shown in FIGS. 2-3 and in FIG. 6.

More particularly, test tab stripping station 94 firstly includes a stop means 120 disposed at the downstream side of station 94. Stop means 120 includes an air cylinder driven, actuator base member 122 disposed adjacent one side of delivery track 26 and mounted to frame 24. Extending above base member 122 is a stop arm assembly 124 which includes a stop arm mounting member 126, a cantilevered stop arm 128 extending at one end from mounting member 126 and having a downwardly extending stop tab or pin 130 extending from its opposed end. Stop arm 128 extends from mounting member 126 across the top surface of delivery track 26 to a point intermediate the width of top opening 50. The air cylinder actuator in base member 122 is effective to raise and lower stop arm assembly 124 between a release position, wherein stop pin 130 is raised out of top opening 50 to permit passage of an intermediate harness product 10 out of stripping station 94, and a stop position, wherein stop arm assembly 124 is lowered so that stop pin 130 is positioned through top opening 50 and within connector channel 36.

In its lowered stop position, stop pin 130 introduces a stop abutment within delivery track 26. More particularly, as an advancing harness product 10 is conveyed into test tab stripping station 94, the leading face of connector 14 will abut against lowered stop pin 130. As has been mentioned, belts 60 and 62 are adjusted to lightly frictionally engage the sides of connector 14 and when the connector reaches stop pin 130 the belts 60 and 62 slip along the sides without damaging the connector. Accordingly, as long as stop pin 130 is in its lowered position, intermediate harness product 10 is retained within test tab stripping station 94.

Stripping station 94 also includes a stripping assembly 132 including an outer movable frame structure 134 and an inner stationary frame 136. Outer movable frame 134 has a table-like configuration including a pair of opposed vertical leg members 138 and 138', which are disposed on either side of delivery track 26 and spaced apart therefrom. Interconnecting leg members 138, 138' is a horizontal planar member 140. Mounted on the interior of each leg member 138, 138' extending inwardly toward delivery track 26 are stripper blade assemblies 142, 142' which include in turn air cylinder actuators 144, 144', horizontally reciprocable actuator pistons 146, 146'; which carry blade cartridges 148, 148' which contain stripper blades 150, 150'.

Inner frame 136 is also of a table-like configuration and includes vertical leg portions 152, 152' fixedly mounted at their lower ends to frame assembly 24 and connected at their opposed upper ends by horizontal platform member 154. Intermediate the width of each vertical leg 152, 152', a U-shaped groove or cut out is provided extending upwardly from a midpoint of each leg 152, 152' to platform member 154, adapted to receive actuator pistons 146, 146' therethrough.

Extending from the upper surface 156 of platform 154 of inner frame 136 is a vertical actuating means comprising a cylinder 158 and upwardly extending piston rod 160. The horizontal planar member 140 of outer frame 134 is fixedly connected to the upper end of piston rod 160 by a cap nut 162. Also extending from upper surface 156 are guide rods 164 and 166 which are received through complementary guide holes or cut outs in planar member 140 to stabilize the position of outer frame 134 with respect to inner frame 136 during the stripping operation.

In operation, stripping station 94 performs the function of exposing a minor portion of the conductors present in test tab 20. By either a timing sequence or an optical sensing device, the stop arm assembly 124 is actuated to its lowered position to stop an advancing harness product 10 in stripping station 94 in position for the stripping operation. Thereafter, air cylinders 144, 144', are actuated to move actuator pistons 146, 146' to an extended inward position to bring stripper blades 150, 150' into gripping contact with the insulation on either side of test tab 20. With the stripper blades 150, 150' still in their extended closed position, vertical air cylinder 158 is actuated to effectively lift the entire outer frame 134 and attached apparatus in a short, upward vertical stroke. The connector 14 is maintained within delivery track 26 during the upward stroke by step shoulders 46 and 48. The upward stroke of air cylinder 158 is short but sufficient to cause tearing by stripper blades 150, 150' of the bulging insulation surrounding conductors within test tab 20 to thereby expose a short segment of those conductors immediately above the upper surface of connector 14.

At the end of their upward stroke, air cylinders 144, 144' are again actuated to a release position wherein actuator pistons 146, 146' are retracted to their outward position withdrawing the stripper blades 150, 150', out of contact with test tab 20 and vertical air cylinder 158 is actuated to its lowered position. The stop arm actuator 122 is activated to move stop arm assembly 124 to its raised position, thereby releasing stripped intermediate harness product 10 for further advancement by belts 60 and 62 to the next work station, harness testing station 96.

Figure 7:
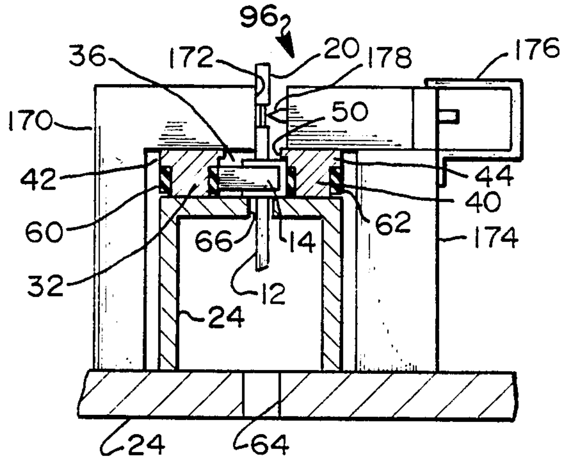
FIG. 7 is a partial side elevation view of the tab testing station of the new and improved testing assembly, taken along lines 7—7 of FIG. 3.

Harness testing station 96 is shown in FIGS. 2-3 and 7. Harness testing station 96 includes a two part testing assembly 168 which effectively surrounds delivery track 26. The first half of the testing assembly 168 comprises an inverted L-shaped member 170 mounted to frame 24 on one side of delivery track 26 extending at its upper portion across the top surface of track 26 and a part of top opening 50, to provide an inner non-conductive vertical surface 172 against which stripped test tab 20 may slide or move during the testing step.

The other half of testing assembly 168 is a complementary inverted L-shaped member 174 also mounted to frame 24 on the opposite side of delivery track 26. The upper portion of test member 174 includes a testing control module 176 electrically connected to a pair of spaced test probes 178, and 180 extending from the inner side thereof to a point above top opening 50 in delivery track 26. Test probes 178 and 180 are positioned to wipingly engage the exposed conductor portions of test tab 20 adjacent the upper surface of connector 14.

Test probes 178 and 180 are spaced apart by a distance substantially equal to the centerline spacing of the conductors within the multiconductor cable 12. Accordingly, when test probe 178 makes wiping electrical contact with a first conductor within test tab 20 test probe 180 will simultaneously wipingly contact a second immediately adjacent conductor of test tab 20. As an intermediate harness product 10 is advanced by delivery track 26 through testing station 96, test probe 178 wipingly contacts the second conductor as test probe 180 makes wiping contact with a third conductor in test tab 20. Test probe 178 and 180 are positioned to wipingly contact pairs of adjacent conductors in test tab 20, successively and continuously one pair at a time, for all of the conductors present in the cable 12. By an electrical testing design, adjacent circuits of intermediate cable harness 10 can be tested, by testing the extension of these circuits as represented by the conductors present in test tab 20.

More particularly, in a preferred embodiment, test probes 178 and 180 are designed to measure the electrical continuity between each pair of adjacent conductors within test tab 20. In accordance with this method, the control module applied a test voltage between test probes 178 and 180 to compare adjacent circuits of the intermediate harness 10. At any time during wiping engagement, the presence of a flow of current between adjacent parallel circuits indicates a defective cable harness, because it indicates that there is a short between them.

The control module 176 includes an optical sensor which identifies a gap between the downwardly extending cables 12 from abutting connectors 14 on adjacent intermediate harnesses 10. As soon as a cable gap is sensed, the control module 176 identifies adjacent pairs of harness products 10 and generates an output signal to a control unit (not shown) for the next work station, test tab trimming station 98. The output signal identifies each harness product 10 in an advancing a pair and assigns an identifying label, e.g. A or B.

Figure 8:
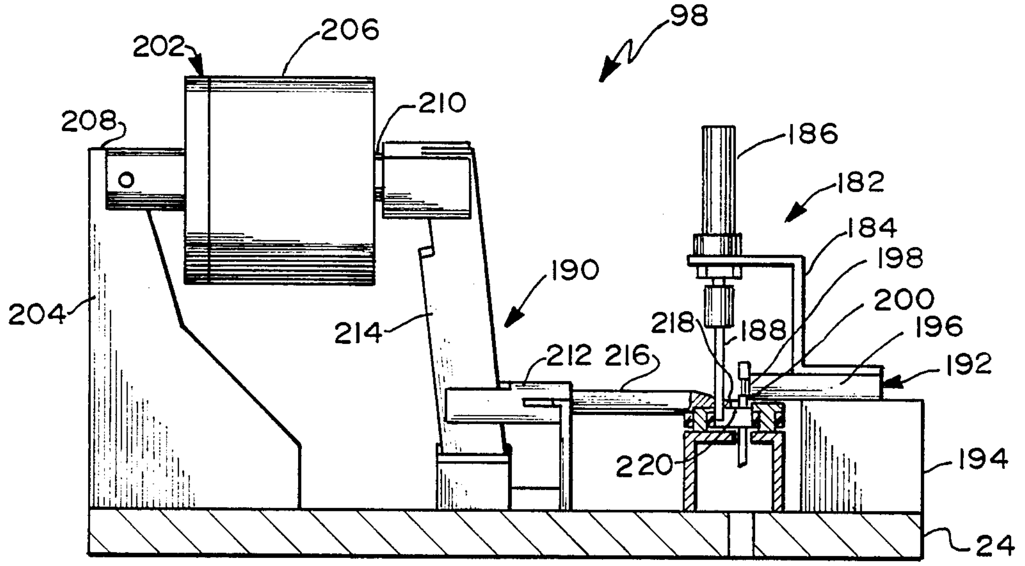
FIG. 8 is a partial side elevation view of the tab trimming station of the new and improved testing assembly, taken along line 8—8 of FIG. 3.

The test tab trimming station 98 is shown in FIGS. 2–3 and 8. As shown in FIG. 8, test tab trimming station 98 also includes a vertically reciprocable stop pin assembly 182, including mounting arm 184, pin air cylinder 186 and stop pin 188. Stop pin assembly 182 operates in a manner similar to the earlier stop arm assembly 124. Stop pin 188, disposed at the downstream end of trimming station 98, is actuable between a lowered position wherein stop pin 188 extends through top opening 50 into connector channel 36 ot retain an advancing stripped and tested intermediate cable harness 10 within trimming station 98 and a raised position wherein stop pin 188 is upwardly withdrawn out of top opening 50.

Test tab trimming station 98 also includes a two-part tab trimming assembly 190 including a back stop member 192. Back stop member 192 includes a base 194 mounted to frame 24 adjacent one side of delivery track 26 including a cantilevered top portion 196 to which mounting arm 184 is mounted. The inner facing surface 198 of top portion 196 is disposed over top opening 50 and is positioned to slidingly engage test tab 20.

Blade actuating assembly 202 is located on the opposite side of delivery track 26. Actuating assembly 202 independently actuates a pair of identical blade trimming means, only one of which will be discussed in detail hereinafter. Actuating assembly 202 includes an upstanding mounting member 204 having a blade actuating air cylinder 206 mounted to its upper end 208. Air cylinder 206 actuates piston rod 210 which is mechanically linked to trimming blade mounted arm 212 by means of a pivotally mounted linker arm 214. Piston rod 210 reciprocates between a retracted position as shown and an extended position wherein rod 210 is advanced toward back stop member 192. In its extended position, piston rod 210 carriers linker arm 214 towards delivery track 26 which in turn moves blade mounting arm 212 toward back stop member 192.

Disposed at the forward end of blade mounting arm 212 is a bevelled test tab trimming blade 216 having a forward recessed cutting edge 218. Disposed at the sides of cutting edge 218 are blade stand-off projections 220, which in effect provide a recessed blade area for cutting edge 218. As the trimming blade 216 is moved towards back stop member 192, harness test tab 20 is received between blade stand-off projections 220 into the recessed blade area 218. Blade 216 is fully extended when stand-off projections 220 abut back stop 192. In this fully extended position, the recessed cutting edge 218 penetrates part way through the test tab 20, but not completely. The partial shearing, through test tab 20 has been found effective to sever test tab 20 from connector 14 at the end of the cutting stroke. The use of a recessed cutting blade which partially penetrates the test tab 20 provides for extended blade life. At completion of the forward cutting stroke of tab trimming blade 216 air cylinder 206 is again actuated to a retracted position and stop pin air cylinder 186 is actuated to raise stop pin 188 to permit the completed and tested harness product 10 to advance to the final unloading station 100 disposed at end 38 of delivery track. 26.

In the preferred embodiment shown in FIGS. 2–3 and 8, the trimming station 98 will include two independently controlled tab trimming blade assemblies, for trimming satisfactorily tested intermediate harnesses two at a time. As can be appreciated the start of the trimming cycle can be controlled by an optical sensing means.

Trimming assembly 190 is controlled by an electronic control not shown which is capable of receiving and interpreting output signals from the testing control module 176. The trimming control is set to trim each test tab 20 from every intermediate harness product 10 of an abutting pair unless a negative output signal for one or the other or both of the pair of harnesses is given to it by the testing control module 176. In the event of a negative output signal, one or the other, or both, of the trimming blade actuators will not stroke during that cycle.

After passing through tab trimming station 98, trimmed or untrimmed cable harnesses are advanced by delivery track 26 to final unloading station 100.

Unloading station 100 as shown in FIG. 3 comprises a split plate 222 disposed immediately adjacent end 30 of delivery track 26 configured to receive harness products spilling out of delivery track 26. No drive belts are provided in unloading plate 222, so unloaded harnesses will stack up along unloading plate 222 and eventually drop off open end 224 into a storage container.

In accordance with the present invention, the presence of an untrimmed test tab 20 on a cable harness 10 at unloading station 100 provides ready visual indication of a defective cable harness. Tested harnesses may be manually separated by an operator positioned at unloading station 100. In addition, more elaborate sorting devices will suggest themselves to those skilled in this art.

For example, an optical sensor could be properly positioned at unloading station 100 for detecting the presence or absence of an untrimmed test tab 20. A divergent Y-shaped conveyor mechanism including a movable track switching member adapted to respond to the signal from the optical sensor, could divert defective harnesses along one path and quality harnesses along the other path as a means for sorting out low quality harnesses.

In addition, the presence of an untrimmed test tab 20 can used to recognized a defective harness prior to installation at a remote assembly operation and defective harnesses could be sorted out at this location.

The present method and apparatus permits electrical testing of cable harnesses as an integral part of the harness fabrication process. Electrical testing is performed on the harness test tab 20, without penetrating or probing the cable portion of the harness itself, and without subjecting the connectors to probing and testing, which due to misalignments or lack of care on the part of an operator or an automated probe, can often damage the electrical contacts within the connectors, or the connector housings or both.

The visual identification of a defective harness by means of the untrimmed test tab provides necessary information at the harness fabrication facility and also at a remote installation and assembly operation.

Although the present invention has been described with reference to certain preferred embodiment, modifications or changes may be made therein by those skilled in this art. For example, the test tab can be provided and tested in accordance with the method of this invention by probing the ends of a pair of adjacent conductors of the test tab, all at the termination station, prior to trimming. In addition, in place of air cylinders, solenoids or other power means may be used. All such obvious modifications and changes may be made therein by those skilled in this art without departing from the scope and spirit of this invention as defined by the appended claims.

We claim:

1. In a method for fabricating an electrical cable harness including the steps of:

providing a termination station whereat an insulated multiconductor cable is terminated to a multi-circuit connector; feeding multiconductor cable to said termination station; supplying connectors to said termination station; applying a connector to the cable while at the termination station; cutting the cable adjacent the connector to provide a cable harness product; ejecting the harness product thus formed from the termination station; and testing the electrical integrity of the cable harness, the improvement in said harness testing step comprising:

cutting said cable at a point spaced from the connector to form an intermediate harness product having a test tab including segments of the cable conductors extending beyond the connector;

stripping at least a portion of the insulation from the test tab to expose a portion of the conductor segments;

electrically testing by engaging adjacent exposed portions of the conductors with a test probe to test the electrical integrity of the harness between them;

repeating the above step for all of the adjacent conductors of the cable harness tab;

generating an output signal indicative of a positive or negative test result to a trimming actuator control;

selectively trimming the test tab only from those harnesses which generated a positive output signal during the testing step, and thereafter deliverying the tested harness product to an unloading station, whereby the presence of a test tab on a harness product at the unloading station provides a ready visual indication of a defective cable harness.

2. The method of claim 1 wherein said electrical testing comprises applying a test voltage between adjacent exposed portions of the conductors by contacting them with a double-pronged test probe and measuring the presence or absense of current flow between the adjacent conductors.

3. The method of claim 2, wherein said output signal is generated by a control module capable of identifying each intermediate harness product and wherein a positive signal is generated for a consistent absence of current flow.

4. In a harness fabricator of the type including a termination station whereat insulated multiconductor cable is terminated to a multi-circuit connector, means for feeding multiconductor cable to said termination station, means for supplying connectors to said termination station, means for applying a connector to a cable at the termination station, means for cutting the cable adjacent the connector, means for ejecting the terminated and cut cable harness from the termination station, and harness testing means for testing the electrical integrity of the cable harness, the improvement in the harness testing means comprising:

said cutting means being adjustable to cut said cable at a point spaced from the connector to form an intermediate harness product having a test tab including segments of the cable conductors extending beyond the connector;

stripping means for baring the insulation from at least a portion of the test tab to expose a portion of the conductor segments; a cable tab probe for electrically engaging adjacent conductors of the cut and stripped tab to test the electrical integrity of cable harness test tab; and means for trimming the tab after testing, whereby a harness fabricator including simultaneous production and quality control testing capability is provided.

5. A harness fabricator as in claim 4, wherein said cable tab probe comprises a double-pronged probe electrically connected to a testing control module, said testing control module being capable of applying a test voltage across the prongs of the test probe and measuring the presence or absence of current flow.

6. A harness testing arrangement comprising:

an intermediate harness product including a multiconductor cable segment said cable having parallel spaced-apart insulated conductors and at least one multi-circuit electrical connector terminated to said cable segment, said intermediate harness product further including a test tab including segments of the cable conductors extending beyond said connector; and a harness tester assembly comprising a frame assembly;

an elongate delivery track extending substantially the length of said frame from a harness receiving end to a final unloading end including harness advancing means for conveying said intermediate cable harness product along the delivery track;

an array of work stations operatively connected to the frame assembly disposed along the delivery track, the array of work stations including;

a harness receiving station disposed adjacent said harness receiving end including means for gripping the intermediate harness product adjacent said connector opposite the test tab and means for introducing the gripped harness product into engagement with the advancing means in said delivery track;

a conductor stripping station including means for temporarily stopping the advancing intermediate harness product at the stripping station for a time sufficient to permit conductor stripping menas to strip a portion of the insulation from the conductors of the test tab, said stripping means including control means for releasing said temporary stop means after completing the stripping step to release the stripped intermediate harness product for continued advancement in the delivery track;

a harness testing station including electrical testing means including a plurality of spaced test probes disposed above the delivery track and adapted to wipingly engage barred segments of adjacent conductors of the test tab for electrical testing of adjacent circuits within the intermediate harness product as it moves through the testing station, said electrical testing means including means for generating an output signal indicative of a defective harness product;

a test tab trimming station including a temporary stop means for retaining the harness product in the trimming station, blade means for cutting the test tab from the connector and trimming control means adapted to receive and interpret output signals from the testing station, said control means being effective to prevent the blade means from cutting the test tab for those intermediate harnesses identified as defective by the output signal from the testing station; and means for electrically releasing the temporary stop means to permit the resulting harness to advance from the trimming station to said final unloading end, whereby, the presence of a test tab on a harness at the final unloading end of the delivery track provides a tready visual indication of a defective cable harness.

* * * * *